United States Patent [19]

Winningham

[11] 3,779,153

[45] Dec. 18, 1973

[54] SLUDGE SEPARATOR

[75] Inventor: Truman Winningham, Monta Vista, Calif.

[73] Assignee: Truman Smog Control, Inc., San Francisco, Calif.

[22] Filed: Apr. 13, 1972

[21] Appl. No.: 243,805

[52] U.S. Cl. ................ 100/116, 210/131, 210/228, 210/351
[51] Int. Cl. ............................................. B30b 9/06
[58] Field of Search ..................... 100/90, 110, 111, 100/116, 126, 148; 210/131, 134, 135, 224–231, 350, 351

[56] References Cited
UNITED STATES PATENTS

| | | | |
|---|---|---|---|
| 3,318,450 | 5/1967 | Watson et al. | 210/134 |
| 3,366,126 | 1/1968 | Velez, Sr. | 100/116 X |
| 405,472 | 6/1889 | Golding | 100/116 X |

*Primary Examiner*—Samih N. Zaharna
*Assistant Examiner*—Robert H. Spitzer
*Attorney*—Thomas E. Schatzel et al.

[57] ABSTRACT

Apparatus for facilitating separation of the liquid and the particulate matter of a sludge mixture. The apparatus including an upright container for receiving a supply of the sludge mixture, said container having inlet means for receiving a supply of said sludge mixture at an elevated sludge receiving zone within the container, a liquid discharge means extending between the interior and exterior of the container engaged to said container about a liquid discharge zone vertically beneath said receiving zone for controlling discharge of liquid from said container and a particulate discharge zone vertically beneath said liquid discharge zone for discharging particulate matter from said container; a plunger member within the interior of the container, the plunger member being movable reciprocably within the container intermediate said sludge receiving zone and said particulate discharge zone; drive means engaged to the plunger member for driving the plunger member vertically within the container between said zones; collector means engaged to the container about the particulate discharge zone for retaining accumulations of the particulate matter; and conveyance means for conveying the collector means from said container to the exterior of the container; said plunger member further including sealant means for sealing said container about the bottom of the liquid discharge zone when said collector means is removed from said particulate discharge zone.

7 Claims, 4 Drawing Figures

SLUDGE SEPARATOR

BACKGROUND OF THE INVENTION

The present invention relates to apparatus for receiving quantities of sludge and facilitating the separation of the particulate matter and liquid of the sludge mixtures. Sludge mixtures are generally comprised of a mixture of liquid substance and solid particulate matter. The liquid serves as a carrier for carrying the particulate matter to various locations. Frequently liquid water is utilized as a carrier for carrying the particles away from a given location.

For example, in my co-pending patent application entitled, "Method, Apparatus and System for Separating Particulate Matter from Gases Laden Therewith and Accumulating the Particulate Matter," filed Jan. 31, 1972, Ser. No. 222,228, now U.S. Pat. No. 3,733,787, reference is made to sludge separating apparatus for separating accumulated dust particles carried by a separating liquid (water) after said dust particles have been separated from a dust-laden gas (air). In various industrial, commercial and other applications, it is desirable to further separate the accumulated particles from the liquid. Separation of the particulate matter from the liquid is desirable so as to permit further use of the liquid apart from the particulate matter; to permit further use of the particulate matter apart from the liquid; and/or to avoid environmental pollution with said sludge. In various applications, the particulate matter may be a pollutant such that it is desirable to remove the pollutant prior to its being carried and widely dispersed within the environment by said liquid carrier.

In various applications for separators, the particulate matter has a specific gravity exceeding that of the liquid such that accumulation of the particulate matter tends to take place by sedimentation. However, considerable time is commonly required for sedimentation and it is frequently necessary that the mixture be retained relatively motionless during sedimentation to realize effective sedimentation and separation of the particulate matter and liquid.

The present invention provides apparatus adapted to accelerate the separation of the particulate matter from the solution and for removal of the separated particulate matter from the liquid.

SUMMARY OF THE INVENTION

The present invention pertains to apparatus for facilitating the separation of particulate matter and liquid of a sludge mixture comprised of the particulate matter and liquid. The apparatus includes a container to receive a supply of the sludge mixture. The container may be viewed as being vertically segmented into three zones — a sludge receiving zone near the top of the container where the incoming sludge is received; a liquid discharge zone vertically beneath the sludge receiving zone and where the liquid may be released from the interior of the container; and a particulate discharge zone vertically beneath the liquid discharge zone where the accumulated particulate matter may be collected and released from the container. A plunger member is positioned within the container and movable vertically in reciprocal motion in the container between the sludge receiving zone and the particulate discharge zone. In the downward stroke the plunger continuously increases the pressure against that portion of the sludge beneath the plunger thereby forcing the particulate matter towards the bottom of the container and the particulate discharge zone. The plunger includes a plurality of one-way valves for controlling passage of sludge and liquid between the bottom side and top side of the plunger. On the upward stroke, the valves permit the mixture above the plunger to pass through the valves to the underside of the plunger. On the downward stroke (compression stroke), the valves tend to close as the pressure increases. At the same time, the plunger urges the particulate matter towards the bottom of the container. In its lowermost position on the compression stroke the plunger also serves as a sealant between the liquid discharge zone and particulate discharge zone. In this position, the one-way valves of the plunger close completely and the plunger engages a sealant about its periphery to seal the liquid above the plunger from migrating to the undersurface of the plunger. The apparatus further includes collector means positioned within the particulate discharge zone for collecting the accumulated particulate matter beneath the plunger. While the plunger is in its lowermost position of the compression stroke, the collector means may be released from the container and the accumulated particulate matter removed from the collector means. After the collector means are repositioned, the plunger may be released and raised to the top again to repeat the compression stroke.

DETAILED DESCRIPTION OF THE PREFERRED EMBODIMENT

Figure 1:
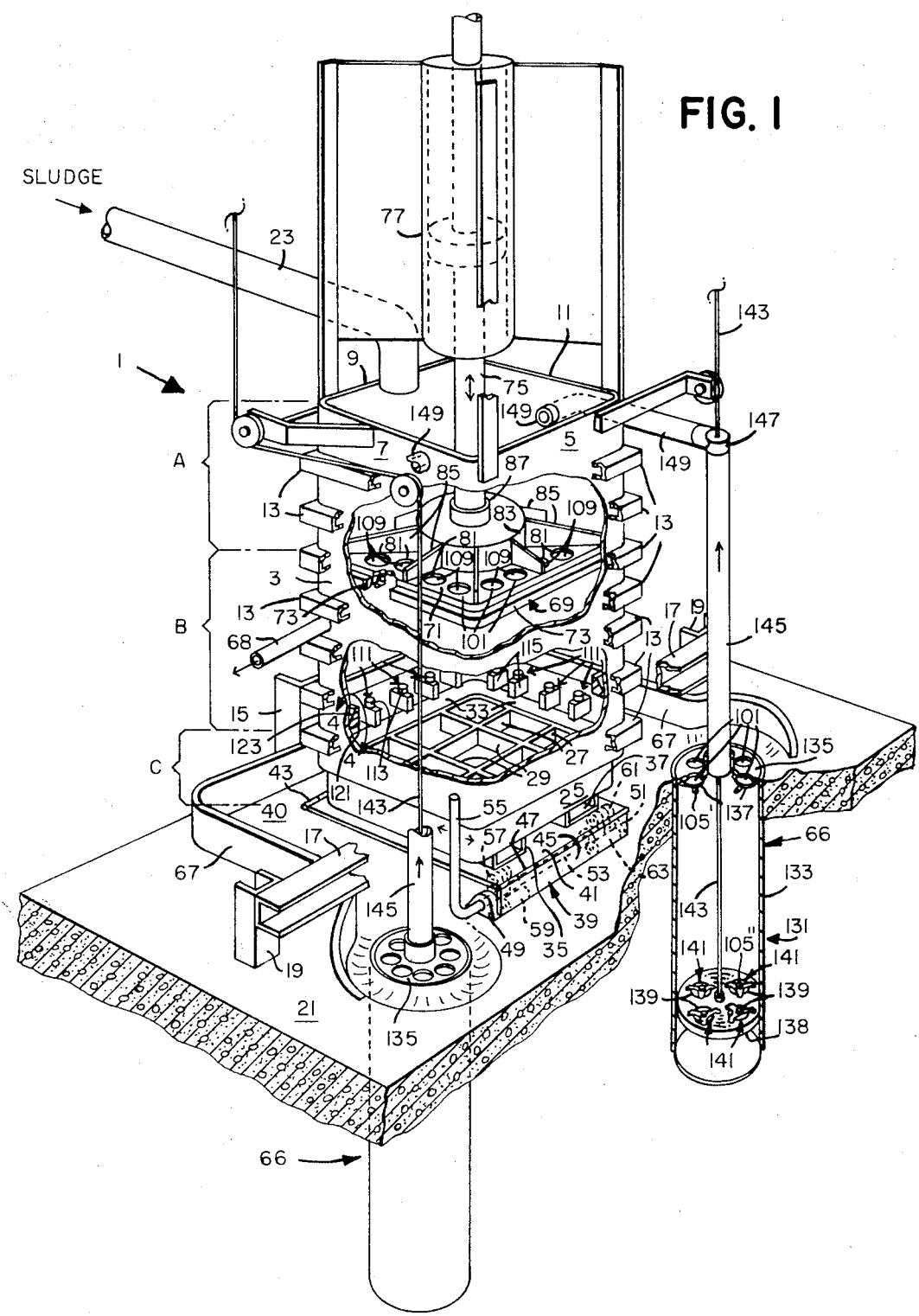
FIG. 1 is a perspective, partially sectioned view of apparatus according to the present invention.

FIG. 1 is a perspective, partially sectioned view of apparatus, referred to by the general reference character 1 incorporating the teachings of the present invention. The apparatus 1 is adapted for receiving a sludge mixture comprised of a liquid and particulate matter and accelerating the separation of the particulate matter from the liquid. An application for the apparatus 1 is as part of an environmental control system for separating accumulated cement particles carried by liquid water. For example, the present apparatus may be incorporated as part of the system disclosed in my co-pending application, Serial No. 222,228, now U.S. Pat. No. 3,733,787, to facilitate separation of accumulated cement particles from the water and then removing the accumulated cement particles.

The apparatus 1 includes a substantially rectangular shaped upright container 3 comprised of four integral sidewalls 5,7, 9 and 11. The container 3 may be comprised of a structural material such as steel so as to hold a large volume of the mixture. The container 3 may be in the order of 12 feet high with a square internal cavity of four and one-half foot lateral width. The container 3 is reinforced by a plurality of reinforcement ribs 13, each encompassing the exterior of the walls 5, 7, 9 and 11 of the container. The container 3 is supported vertically by a pair of back vertical support columns 15.

Each column 15 is secured adjacent to a corner of the container 3. The container 3 is further supported vertically by engagement to a lateral cross-beam 17 which is engaged to the container intermediate a pair of the ribs 13 extending across the front wall 5. The lateral cross-beam 17 is engaged at its terminal ends to a pair of vertical support column 19. The vertical support columns 15 and 19 and the cross-member 17 support the container 3 in a vertical level position above a reference plane 21. The reference plane 21 may be in the form of a reinforced cement base slab adapted to provide a firm structural support base for the apparatus 1.

The incoming sludge mixture, comprised of the liquid solution and particulate matter enters the container 3 about the top edge of the container by means of an inlet pipe 23. The area within the container at which the incoming sludge is received, is hereinafter referred to as the "sludge receiving zone A" of the container 3 which receiving zone is elevated relative to the reference base 21. The sludge receiving zone A may be viewed as extending approximately one-third of the vertical distance of the container 3 from the top. The sludge particles having a specific gravity exceeding that of water tend to migrate through the sludge receiving zone A towards the bottom of the container 3.

Figure 2:
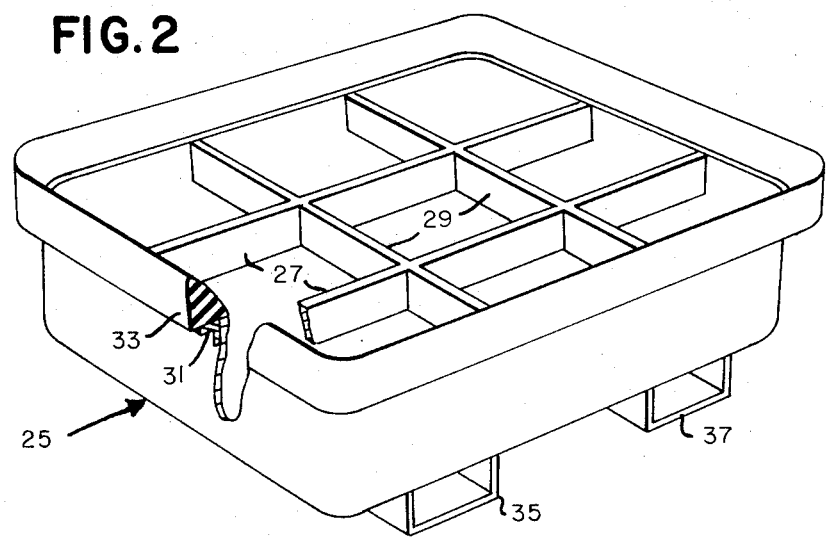
FIG. 2 is an enlarged perspective view of the particulate collection retainer of the apparatus of FIG. 1.

About the bottom of the container 3 there is provided a collector means for collecting accumulated particles from the mixture. The collector means is positioned within that portion of the container 3 which is hereinafter referred to as the "particulate discharge zone C." Intermediate the zones A and C is a zone B hereinafter referred to as the "liquid discharge zone B." The collector means is illustrated in the form of a steel retainer box assembly 25 illustrated in an enlarged view in FIG. 2. The retainer box 25 is in the form of a rectangular-shaped retainer having reinforced cross-members 27 and 29 within the interior and extending between the sidewalls of the retainer. The retainer box 25 carries an L-shaped metal lip 31 extending about the exterior periphery near the top edge. Engaged to the upper surface of the L-shaped lip 31 is a pliable sealant member 33. The sealant 33 extends about the entire periphery of the retainer 25 over the lip 31 and extends laterally beyond the lip 31. The sealant 33 has an outer vertical surface and a tapered inner surface which is tapered towards the interior of the retainer 25. The sealant 33 serves as a seal member to provide a peripheral liquid sealant to discourage penetration by the liquid or particulate matter about the periphery of the retainer 25 when the retainer 25 is secured in place within the particulate discharge zone C of the container 3 as shown in FIG. 1.

The retainer 25 is further adapted to serve as a conveyor means for removing the accumulated particulate matter from the discharge zone C. The retainer 25 carries a pair of forklift receptacle means 35 and 37 such that the retainer 25 may be removed from and replaced to the container 25 as the retainer becomes loaded with accumulated particulate matter. Beneath the particulate discharge zone C of the container 3 is a lift assembly referred to by the general reference number 39 supported by a tapered bottom wall 40. The lift assembly 39 is adapted to receive the retainer 25, and then lift and secure it in place in the particulate discharge zone C while it accumulates particulate matter. When the retainer is filled with particulate matter, the lift assembly 39 lowers the retainer 25 so that it may be engaged by a fork lift and removed. The lift assembly 39 comprises a flat platform 41 engaged about one terminal end to an anchor hinge 43 supported by the bottom wall 40 such that the platform 41 may be pivoted about the anchor hinge 43. The front terminal end of the platform 41 is engaged to a lift wall 45 by means of a hinge 47. The lift wall 45 may pivot about the hinge 47. The platform 41 and lift wall 45 are coupled to a leverage assembly to permit the wall 45 to pivot about the hinge 47.

The leverage assembly includes a pair of anchors 49 and 51 secured to the bottom wall 40 and positioned about opposite lateral sides of the wall 45. A central rod 53 extends through the anchors 49 and 51 and is pivotable relative thereto. The rod 53 is integral with a leverage arm 55 such that the rod 53 pivots responsive to the leverage arm. The rod 53 is also integral with a pair of rollers 57 and 59 about the anchor 49 and with a pair of rollers 61 and 63 about the anchor 51. In the position illustrated in FIG. 1, the rollers 57 and 61 urge the platform 41 in the vertical direction to urge the retainer 25 in position within the particulate discharge zone C of the container 3 to accumulate particulate matter. Also, in this position, the lift wall 45 provides vertical support to the retainer 25 and the retainer is maintained in a substantially horizontal postion. The sealant 33 tends to seal the interior of the walls 5, 7, 9 and 11 and the container 25. When it is desired to permit the retainer 25 to be lowered from the container 3, the lever arm 55 is urged counterclockwise such that the rollers 59 and 63 urge the lift wall 45 to rotate counterclockwise about the hinge 47. This in turn, lowers the front of the platform 41. Lowering of the platform 41 permits the front end of the retainer 25 to drop from the zone C. The lift assembly is adapted such that when lowered, the retainer is in an inclined position with the front end, clear of the walls of the container 3. Thus, in this position, a forklift may engage the receptacles 35 and 37 and remove the retainer for emptying. Then a new retainer 25, or the original retainer 25 may be returned to the platform 41 with the back edge of the retainer in its furthermost position. The retainer is then secured in place for accumulating particulate matter by lifting the front end of the retainer by the lift assembly 39. The lever arm 55 is rotated clockwise thereby urging the front end of the platform 41 upward along with the front end of the retainer 25. When the retainer 25 is in position, the lift wall 45 is vertical and supports the front end of the platform and retainer 25.

As illustrated, the lift assembly 39 is engaged to the tapered ramp 40. The ramp 40 is tapered towards the front and funnels towards a pair of spillage collector means illustrated in the form of swab reservoirs 66. The ramp 40 has a sidewall 67 and is adapted to direct spillage from the retainer 25 to the reservoirs 66.

Intermediate the zone A and C is a zone B hereinafter referred to as the "liquid discharge zone B." A liquid discharge portal 68 is engaged to the container 3 within the zone B to permit discharge of the liquid matter.

Within the interior of the container 3 is a reciprocally driven plunger assembly 69. The plunger assembly 69 includes a plunger plate 71 adapted to be reciprocally driven up and down within zone B intermediate zones A and C. The plate 71 has peripheral dimensions slightly less than the interior peripheral dimensions of the container 3. A pliable sealant ring 73 is engaged about the periphery of the base plate 71 so as to permit sliding movement between the plunger plate 71 and the container walls 5, 7, 9 and 11 and simultaneously provide a liquid seal about the periphery of the plunger plate. The plunger plate 71 is mounted about a central shaft 75 co-axial with the container 3. The plate 71 forms a substantially horizontal surface facing the discharge zone C which increases the pressure on the particulate matter and liquid beneath the plate as the plate 71 approaches zone C. The shaft 75 is slidable within a hydraulic double-acting cylinder 77 about the top of the container 3. Said double-acting cylinder functions as a drive means for reciprocally driving the plunger assembly within the container 3. The base plate 71 carries 16 evenly spaced apertures 81 about the periphery to permit sludge to pass between the top side and bottom side of the plate 71. The base plate 71 is engaged to a central support ring 83 co-axial with the shaft 75. A plurality of support webs 85 are engaged to the base plate 71 and the support ring 83 for physical support. The shaft 75 is coupled to the base plate 71 by means of a coupling 87 welded to the base plate 71 and shaft 75.

Figure 3:
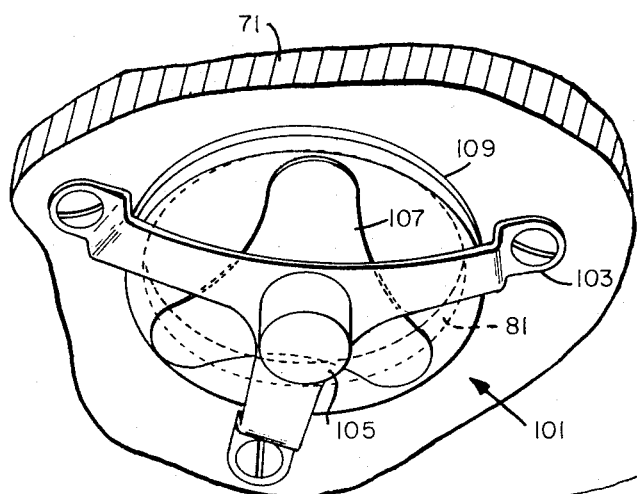
FIG. 3 is an enlarged view of a one-way valve of the plunger of the structure of FIG. 1.

A pressure-sensitive one-way valve assembly 101 is engaged about each of the apertures 81 of the base plate 71 to control flow of sludge between the top and bottom side of the plate 71. FIG. 3 illustrates an enlarged view of one of the valve assemblies 101. Each of the valves 101 include a physical stationary three-legged support 103 engaged to the plate 71 about the bottom side of the associated aperture 81. The support 103 is flexible in the vertical direction. The support 103 has a cylindrical protrusion 105 extending from the bottom surface and co-axial with the aperture 81. Above the support 103 is a butterfly-shaped spring member 107 and above the spring member 107 is a pliable rubber disc 109 having a diameter slightly greater than that of the aperture 81. The butterfly spring 107 is adapted to naturally urge the rubber disc 109 vertically downward away from the aperture 81 such that the valves 101 are normally open. Accordingly, the valve assembly 101 is such that in the absence of any counter-opposing forces the spring 107 tends to hold the gasket 109 away from the apertures 81 thereby permitting the flow of liquid and sludge from above the plate 71 to the underside of the plate 71. However, as the relative pressure against the flexible support 105 and spring 107 increases on the vertical downward stroke of the plunger assembly 69, the valves 101 tend to progressively close and seal the apertures 81. At the same time, as the pressure beneath the plate 71 decreases relative to the pressure above the plate 71, for example, on the vertical upward stroke of the plunger assembly 69, the valve 101 tends to open. Thus, on the downward stroke, the valves 101 progressively restrict flow through the apertures 81 and on the upward stroke, the valves 101 permit flow.

Figure 4:
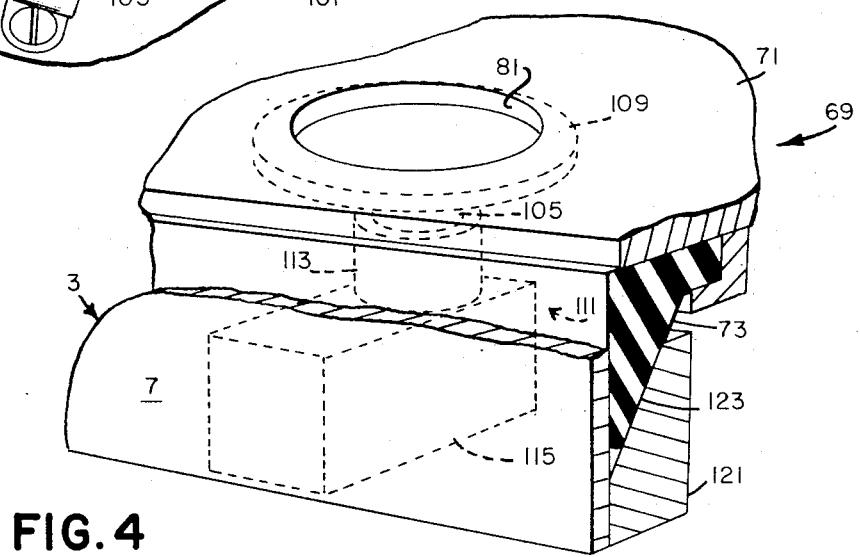
FIG. 4 is an enlarged view of the section along line 4—4 of FIG. 1 when the plunger is in the lowermost postion on its compression stroke.

As illustrated in FIGS. 1 and 4, a permanent stop assembly 111 is associated with each of the valves 101. Accordingly, there are 16 stop assemblies 111 secured to the interior of the walls 5, 7, 9 and 11 of the container 3 about the top edge of the particulate discharge zone C with each stop in alignment with one of the valves 101. Each of the stop assemblies 111 carries a cylindrical type stopper protrusion 113 in axial alignment with the stud 105 of the associated valve assembly 101. The stoppers 113 are supported by a support member 115 secured to the interior of sidewalls of the container 3 and projecting internally. Accordingly, as the plunger assembly 69 approaches the particulate discharge zone, each of the valve studs 105 of the valve assemblies 101 engage the associated valve stud 105. As the plunger 69 tends to further travel after the initial engagement of the studs 105 and the stoppers 113, the resiliency of the support 103 and spring 107 are overcome thereby causing a more secure sealant of the pliable disc 109 about the apertures 81.

The sidewalls 5, 7, 9 and 11 also carry a plunger stop and a sealant means in the form of a seal rib 121. The rib 121 forms a V-shaped slot 123 extending about the periphery of the container. The slot 123 is adapted to align and inter-engage with the pliable sealant gasket 73 engaged to the plunger assembly 69. Accordingly, as the plunger 69 approaches the solid particulate discharge zone on the downward stroke, the sealant gasket 73 enters and inter-engages with the slot 123 simultaneously as the studs 105 of the valve assemblies 101 engage the stoppers 113. The closed valve assemblies 101 and inter-engagement of the seal 73 in the groove 123 in turn seal the particulate discharge zone C from the liquid discharge zone B. This in turn permits one to remove the retainer 25 from the particulate discharge zone.

The illustrated swab reservoirs 66 are incorporated to collect spillage of sludge from the particulate discharge zone as the retainer 25 is removed. The reservoirs 66 are located beneath the planar surface of the container and the spillage is channeled into the reservoirs 66. Within each of the reservoirs 66 is a swab pump assembly 131 as illustrated in FIG. 1. The swab pump assembly 131 comprises a metallic casing 133 in the form of a cylindrical housing. At the top of each of the casings 133, is a grate 135 with a plurality of one-way valves 137 similar to the valves 101. The valves 137 are normally open and remain open until a force is applied to the underside. The grate 135-valve 137 combination is designed so as to permit passage of spillage into the swab casing 133 but at the same time prevent spillage from exiting from the interior through the apertures of the grate during the pumping operation of the pump assembly 131. A concave-shaped cup 138 is positioned within the casing 133 and is free to slide vertically within the casing 133. The cup 138 carries a set of four apertures 139. Associated with each of the apertures 139 is a one-way valve assembly 141 similar to the valve assembly 101. However, the valve assemblies 141 are positioned on the top surface of the cup 138 such that the valves tend to close as the cup is raised. The valves 141 and the valves 137 of the grate 135 close when the studs 105' of the valves 137 engage the studs 105'' of the valves 141.

The cups 138 are engaged to a cable 143 which extends through a vertical return pipe 145. The pipe 145 is joined to an elbow 147 common to an extension pipe 149. The extension pipe 149 extends to the container 3 and enters the interior of the container 3 through the sidewall 11. Accordingly, as the swab cup 138 is raised within the casing 133, it collects water and sludge and creates pressure within the casing 133 above the cup 138. As the cup is elevated the pressure increases thereby forcing the valves 137 on the underside of grate 135 and the valves 141 on the cup to close. Closing of the valves 137 and 141 in turn forces the water and sludge to pass up through the return pipe 145 to the interior of the container 3. At the same time, when the cup 138 is lowered within the casing 133, the one-way valves 141 on the cup open, thereby permitting the cup to descend within the casing. The valves 137 on the grate 135 also open to permit spillage to enter the casing 133. When the cup is again raised, the valves 137 and 141 again tend to close due to the pressure. Accordingly, the repetitious raising and lowering of the swab cups 138 pump water and sludge from the casing 133.

In operation, sludge mixture comprising a mixture of particulate matter and liquid is entered to the container 3 through the inlet pipe 23. The incoming sludge is deposited in the sludge receiving zone A. As the incoming sludge is received, the plunger assembly 69 is reciprocally driven vertically within the container 3 while the collecting retainer 25 is secured in position in the sludge discharge zone C. Assuming, for purposes of explanation, that the plunger assembly 69 is initially in its uppermost vertical position, the plunger is driven vertically downward from the zone A through zone B toward zone C. As the base plate 71 of the assembly 69 is driven downward it forces the particulate matter from the mixture towards the sludge discharge zone C and to the interior of the retainer 25 positioned in zone C. As the plate 71 moves downwardly, the one-way valves 101 tend to close as the pressure on the support 103 and spring 107 increases. Accordingly, as the plate 71 penetrates through the liquid discharge zone B, liquid seeps through the valves 101 with the amount of liquid seeping through the valves decreasing as the plate 71 approaches the particulate discharge zone C. When the plate 71 reaches zone C and the valves 101 are sealed about the stop-assemblies 111, the plunger assembly 69 may be held in place. While held in place, zone C is sealed from zone B due to the closure of the valves 101 and the inter-engagement of the sealant 73 in the groove 123. While so held, the retainer 25 may be released by the lift assembly 39, removed and emptied. An empty retainer 25 may then slide in place over the lift assembly 39. The lift assembly 39 is then raised by the handle 55 such that the retainer 25 is secured in place and sealed about its periphery. The plunger assembly 69 may then be activated upward towards the sludge receiving zone A. In moving in the upward direction, the valves 101 open such that the liquid within the liquid discharge zone B may penetrate through the valves 101 on the plate 71. When the plunger assembly 69 reaches its uppermost vertical position it may again be recycled and driven downwardly through zone B to zone C. The plunger assembly may be repeatedly driven up and down until the retainer 25 is filled with particulate matter, at which time the plate 71 is held in place about the stop assemblies 111. When the plunger is held in place about the stops 111, the retainer 25 may again be removed to convey the collected particulate matter. Also, liquid may be discharged through the liquid discharge portal 68. This liquid, which has been significantly separated from particulate matter, may be recycled or otherwise used for other purposes.

Upon removal of the retainer 25 from the particulate discharge zone C, there may be some spillage or overflow from the retainer 25. The spillage will tend to flow towards the spillage reservoirs 66. The spillage reservoirs 66 collect the spillage. The swab pump assemblies 131 in turn, through their reciprocal pumping action within the casings 131 pump the spillage back to the sludge-receiving zone C through the pipes 145.

I claim:

1. Apparatus for separating liquid and particulate matter of a particulate-liquid sludge solution, the apparatus comprising, in combination:

a container for receiving a supply of sludge comprised of a mixture of particulate matter and a carrier liquid, said container having an elevated receiving zone for receiving said sludge, a liquid discharge zone beneath said sludge receiving zone and a particulate discharge zone beneath said liquid discharge zone;

inlet means engaged to the container and extending from the exterior of the container to the interior of the container for permitting entrance of sludge to within said receiving zone;

a plunger member within the interior of the container, the plunger member being movable reciprocally downwardly and upwardly within the container intermediate said sludge receiving zone and said particulate discharge zone, the plunger member including at least one portal penetrating through said plunger to permit liquid solution within said sludge receiving zone and said solution discharge zone to pass through the portal, control valve means engaged to the plunger member about said portal to control passage of solution through said portal, said control valve means being in the form of a pressure sensitive valve which progressively closes said portal as the plunger assembly is driven downward in the container toward the particulate discharge zone;

drive means engaged to the plunger member for driving the plunger member vertically within the container between said zones;

first sealer means for sealing said plunger about the interior of the container and about the sludge discharge zone when said plunger member is in the discharge zone;

collector means positioned about said particulate discharge zone for collecting accumulations of the particulate matter;

means for removing the particulate matter from the collector means; and liquid discharge means engaged to the container for permitting exhaust of the liquid solution from the container.

2. The apparatus of claim 1 wherein the first sealer means is about the periphery of the plunger member and a second sealant means about the interior walls of the container adjacent to said particulate discharge zone, said first and second sealant means being inter-engageable with the another to discourage passage of said liquid or particulate matter intermediate the periphery of the plunger member and container when said first and second sealant means are inter-engaged.

3. The apparatus of claim 2 wherein said collector means is positioned within said particulate discharge zone for collecting particulate matter.

4. The apparatus of claim 1 in which the collector means is in the form of a retainer, said retainer being movable to and from said particulate discharge zone.

5. The apparatus of claim 4 further including spillage collector means for collecting spillage from said discharge zone and passage means extending intermediate said particulate discharge zone and the spillage collector means for funneling spillage intermediate said particulate discharge zone and the overflow collector means.

6. The apparatus of claim 5 further including pump means within the spillage collector means for pumping collected spillage to the container.

7. The apparatus of claim 1 in which
the plunger member includes a base plate positioned within the container and forming a substantially horizontal surface, a plurality of portals extending verically through said plate; and the control valve means includes a control valve engaged about each of said portals to control passage of solution through said portals, the control valves being in the form of a pressure sensitive valve sensitive to the relative pressure differential above the plate and beneath the plate, said control valves progressively closing passage through said portals as the pressure beneath the plate increases relative to the pressure above the plate.

* * * * *